United States Patent [19]
Watanabe et al.

[11] Patent Number: 5,229,046
[45] Date of Patent: Jul. 20, 1993

[54] PROCESS FOR PRODUCING THERMAL SHOCK-RESISTANT SILICON NITRIDE SINTERED MATERIAL

[75] Inventors: Keiichiro Watanabe, Nagoya; Akira Takahashi, Chita, both of Japan

[73] Assignee: NGK Insulators, Ltd., Japan

[21] Appl. No.: 787,955

[22] Filed: Nov. 5, 1991

Related U.S. Application Data

[62] Division of Ser. No. 699,591, May 14, 1991, Pat. No. 5,118,644.

[30] Foreign Application Priority Data

May 17, 1990 [JP] Japan .................. 2-127478

[51] Int. Cl.$^5$ ............................................. C04B 38/00
[52] U.S. Cl. .................................... 264/44; 264/43; 264/65; 501/80; 501/85; 501/92; 501/97
[58] Field of Search .............. 501/80, 85, 97, 92; 264/65, 43, 44

[56] References Cited

U.S. PATENT DOCUMENTS

| | | | |
|---|---|---|---|
| 3,833,389 | 9/1974 | Komeya et al. | 501/92 |
| 3,969,125 | 7/1976 | Komeya et al. | 264/66 |
| 4,097,293 | 6/1978 | Komeya et al. | 264/65 |
| 4,795,724 | 1/1989 | Soma et al. | 264/65 |

FOREIGN PATENT DOCUMENTS

| | | |
|---|---|---|
| 48-7486 | 3/1973 | Japan . |
| 49-21091 | 5/1974 | Japan . |
| 63-100067 | 5/1988 | Japan . |

Primary Examiner—James Derrington
Attorney, Agent, or Firm—Parkhurst, Wendel & Rossi

[57] ABSTRACT

There is provided a thermal shock-resistant silicon nitride sintered material including silicon nitride and rare earth element compounds, which material contains at least 10 pore groups per mm$^2$, each pore group consisting of pores of 10 or less in diameter and which material has a thermal shock resistance $\Delta Tc$ (°C.) of 1,000° C. or more. The thermal shock-resistant silicon nitride sintered material can be produced by mixing and shaping starting materials consisting of silicon nitride powders of rare earth element oxides and carbide powder, and then firing the shaped material in a nitrogen atmosphere to decompose the carbide powders.

5 Claims, 2 Drawing Sheets

1mm

1mm

1mm

PROCESS FOR PRODUCING THERMAL SHOCK-RESISTANT SILICON NITRIDE SINTERED MATERIAL

This is a division of application Ser. No. 07/699,591 filed May 14, 1991 now U.S. Pat. No. 5,110,644.

BACKGROUND OF THE INVENTION AND RELATED ART STATEMENT

The present invention relates to a silicon nitride sintered material having a high-temperature strength, excellent thermal shock resistance and a low Young's modulus, as well as to a process for producing the sintered material.

With respect to silicon nitride sintered materials containing oxides of IIIa group elements including rare earth elements, for example, Japanese Patent Publication No. 7486/1973 discloses a process for producing a sintered material, which comprises mixing and shaping 85 mole % or more of silicon nitride ($Si_3N_4$) and 15 mole % or less of at least one oxide selected from oxides of IIIa group elements and then sintering the shaped material in a non-oxidizing atmosphere; and Japanese Patent Publication No. 21091/1974 discloses a silicon nitride sintered material consisting of 50% by weight of $Si_3N_4$, 50% by weight or less of at least one oxide selected from $Y_2O_3$ and oxides of La type elements and 0.01-20% by weight of $Al_2O_3$.

However, there have been problems that addition of only rare earth elements to silicon nitride fails to provide a sintered material having a high-temperature strength and addition of $Al_2O_3$ provides a sintered material which has a higher density but whose grain boundary phase has a lower melting point and gives a very low high-temperature strength.

In order to solve the problem of high-temperature strength, Japanese Patent Application Kokai (Laid-Open) No. 100067/1988 discloses a technique for achieving a high-temperature strength by adding rare earth elements of given composition and given proportion to a $Si_3N_4$ powder and sintering the mixture to allow the resulting sintered material to have a specific crystalline phase.

The silicon nitride sintered material disclosed in Japanese Patent Application Kokai (Laid-Open) No. 100067/1988 can achieve a high-temperature strength to some extent but has problems that the Young's modulus is as large as 300 GPa and the thermal shock resistance $\Delta Tc$ (°C.) is as small as 1,000° C. This is because the silicon nitride sintered material is homogeneous microscopically, and has a Young's modulus and thermal expansion coefficient characteristic of silicon nitride and, as a result, the thermal shock resistance $\Delta Tc$ (°C.) of the silicon nitride sintered material is substantially determined depending upon its strength. The thermal shock resistance $\Delta Tc$ (°C.) of a ceramic can be evaluated by the following formula.

$$\Delta Tc \propto \sigma/\alpha E$$

[$\sigma$ is a flexural strength (Pa), $\alpha$ is a thermal expansion coefficient (1/°C.), and E is a Young's modulus (Pa).]

The object of the present invention is to solve the above-mentioned problems and provide a silicon nitride sintered material having a high-temperature strength about equal to the room temperature thereof and excellent thermal shock resistance, as well as a process for producing the sintered material.

SUMMARY OF THE INVENTION

According to the present invention, there is provided a thermal shock-resistant silicon nitride sintered material consisting substantially of silicon nitride and rare earth element compounds, which material contains at least 10 pore groups per $mm^2$, each pore group consisting of pores of 10 $\mu$m or less in diameter and having a diameter of 30-100 $\mu$m and which material has a thermal shock resistance $\Delta Tc$ (°C.) of 1,000° C. or more.

The present invention further provides a process for producing a thermal shock-resistant silicon nitride sintered material, which process comprises mixing and shaping starting materials consisting of a silicon nitride powder, powders of rare earth element oxides and carbide powders, and then firing the shaped material in a nitrogen atmosphere to (a) react the carbide powders with the silicon oxide present in the silicon nitride to convert the carbide to nitrides or silicides and simultaneously give rise to decomposition gases and (b) thereby form, in the resulting sintered material, pores of 10 $\mu$m or less in diameter and pore groups each consisting of said pores and having a diameter of 30-100 $\mu$m.

In the present invention, the sintered material obtained can be subjected to a heat treatment of 1,000°-1,500° C. in an oxygen-containing atmosphere to form, on the surface, a surface layer of 5-100 $\mu$m in thickness consisting of silicates of rare earth elements and silicon oxide, whereby a silicon nitride sintered material of higher strength and higher thermal shock resistance can be obtained.

DETAILED DESCRIPTION OF THE INVENTION

In the present invention, a silicon nitride powder containing powders of given rare earth element oxides is mixed with carbide powders and the resulting mixture is fired in a nitrogen atmosphere, whereby is obtained a silicon nitride sintered material which contains at least 10 pore groups per $mm^2$, each consisting of micropores of 10 $\mu$m or less in diameter and having a diameter of 30-100 $\mu$m and which accordingly has a unique microstructure. This silicon nitride sintered material has a high-temperature strength about equal to the room temperature thereof strength and excellent thermal shock resistance.

The silicon nitride as a starting material contains oxygen as an impurity, and this oxygen is present in the form of $SiO_2$. By utilizing the reaction of this $SiO_2$ with carbides in a nitrogen atmosphere, for example, the following reaction, decomposition gases can be generated in the resulting sintered material.

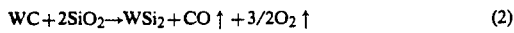

Figure 1:
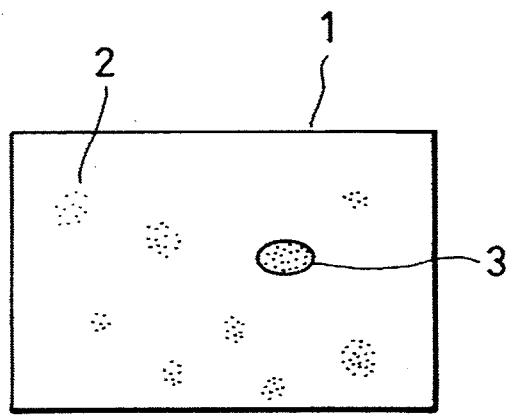
FIG. 1 is a schematic illustration showing the microstructure of the silicon nitride sintered material according to the present invention.

In the present invention, by adding carbides to silicon nitride and decomposing the carbide as above at a temperature close to the sintering temperature, there can be obtained a silicon nitride sintered material having a unique structure as shown in FIG. 1, containing at least 10 pore groups per mm$^2$ of sintered material, each consisting of micropores of 10 μm or less in diameter and having a diameter of 30–100 μm. In FIG. 1, the numeral 1 refers to a sintered material; the numeral 2 refers to micropores; and the numeral 3 refers to a pore group.

Such a silicon nitride sintered material containing groups of micropores causes no deterioration in strength, unlike sintered materials containing ordinary pores. The presence of micropore groups is effective for reduction in Young's modulus, making it possible to obtain a silicon nitride sintered material of high strength and low Young's modulus. As is known, the thermal shock resistance of a ceramic can be evaluated by its ΔTc (°C.), and a larger ΔTc value gives higher thermal shock resistance. When, for example, a material heated to 1,000° C. is placed into cool water of 0° C. and thereby the material begins to cause cracking, etc. and resultantly reduction in strength, the ΔTc (°C.) of the material is defined to be 1,000° C. In general, the ΔTc of a ceramic is given by the following formula $$\Delta Tc \propto \sigma/\alpha E$$

[σ is a flexural strength (Pa), α is a thermal expansion coefficient (1/°C.), and E is a Young's modulus (Pa)], and is dependent upon the strength, thermal expansion coefficient and Young's modulus of the ceramic. Therefore, when the strength is constant, as the Young's modulus is lower, the ΔTc is larger and the thermal shock resistance is higher, providing a more useful material.

The silicon nitride sintered material of the present invention is just such a material, and has a reduced Young's modulus without sacrificing the strength and accordingly has significantly improved thermal shock resistance.

In the present invention, the oxygen amount in the silicon nitride used as a starting material is desirably 1–3% by weight. This oxygen amount can be controlled by oxidizing the silicon nitride, or by adding a $SiO_2$ powder to the silicon nitride.

The total amount of the rare earth element oxides used also as a starting material is preferably 6–21% by weight. When the total amount is less than 6% by weight, it is impossible to obtain a liquid phase necessary for achieving a high density. When the total amount is more than 21% by weight, it tends to be difficult to achieve a high density. As the rare earth element oxides other than $Y_2O_3$ and $Yb_2O_3$, there can also be used $Lu_2O_3$, $Tm_2O_3$, $Er_2O_3$, etc. The total amount of the rare earth elements in sintered material is the same as that in the starting materials.

The amount of the carbides used also as a starting material is preferably 0.5–10% by weight. An amount of less than 0.5% by weight is not effective to sufficiently form pore groups. An amount of more than 10% by weight hinders the achievement of a high density in some cases. The amount of the carbide is more preferably 1–5% by weight. The C content in sintered material is ½ or less of the C content in the starting materials.

Incidentally, the type of carbide is not restricted by the crystalline phase; and, in the case of SiC, there can be used any of α type, β type and amorphous type.

In the process for producing a silicon nitride sintered material according to the present invention, at first there is prepared a mixture of a silicon nitride powder, powders of rare earth element oxides and carbide powders. The mixture is then made into a desired shape to obtain a shaped material. Thereafter, the shaped material is fired at 1,700°–2,100° C., preferably 1,900°–2,000° C., for 3–6 hours in a nitrogen atmosphere of normal pressure to applied pressure corresponding to the firing temperature to (a) react the carbide powders with the silicon oxide present in the silicon nitride to convert the carbide to nitride or silicide and thereby (b) generate the decomposition gases to form pores of 10 μm or less in diameter and simultaneously form groups of said pores, each having a diameter of 30–100 μm, whereby a silicon nitride sintered material of the present invention can be obtained.

It is possible that the thus obtained silicon nitride sintered material itself or after having been subjected to grinding, etc. so as to have a desired shape, is subjected to a heat treatment at 1,000°–1,500° C. in an oxygen-containing atmosphere to form, on the surface, a surface layer of 5–100 μm in thickness consisting of silicates of rare earth elements and silicon oxide and thereby obtain a silicon nitride sintered material further improved in thermal shock resistance.

The present invention is hereinafter described in more detail by way of Examples. However, the present invention is in no way restricted to these Examples.

EXAMPLES AND COMPARATIVE EXAMPLES

There were mixed (a) a silicon nitride powder having a purity of 97% by weight, an oxygen content of 2.2% by weight, an average particle diameter of 0.6 μm and a BET specific surface area of 17 m$^2$/g, (b) powders of oxides shown in Table 1, having a purity of 99.9% by weight and an average particle diameter of 0.3–2.5 μm and (c) powders of carbides shown in Table 1, such as SiC, WC, Mo$_2$C, TiC, NbC, TiC and the like, having a purity of 99% by weight and an average particle diameter of 0.4–3 μm, in proportions shown in Table 1. 200 g of the resulting mixture, 1,800 g of pebbles made of a silicon nitride ceramic and 300 ml of water were placed in a 1.2-l nylon container, and the container was placed in a vibration mill and subjected to vibration of 1,200 times/min for 3 hours to grind the mixture. Then, water was vaporized and the ground mixture was granulated to a particle diameter of 150 μm to obtain a powder for shaping. Thereafter, the powder was subjected to cold isostatic pressing at a pressure of 7 ton/cm$^2$ to prepare a shaped material of 50×40×6 mm, and the shaped material was fired under the firing conditions shown in Table 1 to obtain silicon nitride sintered materials of Examples 1–15 of the present invention. The sintered materials of Examples 10–12 were further subjected to a heat treatment.

Separately, there were mixed the same silicon nitride powder as above, powders of oxides shown in Table 2 and a powder of a carbide shown in Table 2, in proportions shown in Table 2; the resulting mixture was subjected to the same grinding, granulation and shaping as above; the resulting shaped material was fired under the firing conditions shown in Table 2 to obtain sintered materials of Comparative Examples 1–6.

Each of the above obtained sintered materials was measured for bulk density, crystalline phase of grain boundary, 4-point flexural strengths at room temperature, 1,000° C. and 1,400° C., Young's modulus at room temperature and thermal shock resistance ΔTc (°C.). The results are shown in Tables 1 and 2. In Tables 1 and 2, bulk density of the sintered material was measured by the Archimedes' method. This density was expressed in the tables as a value relative to theoretical density, wherein the theoretical density was calculated from the composition of mixed powder and its density. In calculating density of the mixed powder, the following densities were used $Si_3N_4$: 3.2 g/cm$^3$, $Y_2O_3$: 5.0 g/cm$^3$, $Yb_2O_3$: 9.2 g/cm$^3$, $Tm_2O_3$: 8.8 g/cm$^3$, $Lu_2O_3$: 9.4 g/cm$^3$, $Er_2O_3$: 8.6 g/cm$^3$, SiC: 3.2 g/cm$^3$, WC: 15.6 g/cm$^3$, $Mo_2C$: 8.9 g/cm$^3$, TiC: 4.9 g/cm$^3$, TaC: 14.7 g/cm$^3$, and NbC: 7.8 g/cm$^3$. 4-Point flexural strength was measured in accordance with JIS R 1601 "Test Method for Flexural Strength (Modulus of Rupture) of High Performance Ceramics". Crystalline phase of grain boundary was determined from the results of X-ray diffraction by CuK α-rays. In Tables 1 and 2, J is a cuspidine type crystal and gives the same diffraction pattern as $Si_3N_4 \cdot 4Y_2O_3 \cdot SiO_2$ represented by JCPDS card 32-1451, wherein the crystallographic position of Y can be replaced by other rare earth element. H is an apatite type crystal and gives the same diffraction pattern as $Si_3N_4 \cdot 10Y_2O_3 \cdot 9SiO_2$ represented by JCPDS card 30-1462, wherein the crystallographic position of Y can be replaced by other rare earth element. K is a wollastonite type crystal and gives the same diffraction pattern as $2Y_2O_3 \cdot SiO_2 \cdot Si_3N_4$ represented by JCPDS card 31-1462, wherein the crystallographic position of Y can be replaced by other rare earth element. L is a crystal represented by $Re_2SiO_5$ (Re: rare earth element) and gives the same diffraction pattern as any of JCPDS cards 21-1456, 21-1458, 21-1461, 22-992 and 36-1476. S is a crystal represented by $Re_2SiO_7$ (Re: rare earth element) and gives the same diffraction pattern as any of JCPDS cards 20-1416, 21-1457, 21-1459, 21-1460, 22-994 and 22-1103. C is a $SiO_2$ (cristobalite) crystal and gives diffraction patterns represented by JCPDS cards 11-695 and 27-605. The amount of each crystalline phase was determined from the maximum height of the diffraction pattern. In Tables 1 and 2, ">" (inequality sign) refers to "larger" or "smaller" in amount of crystalline phase, and "," refers to "about equal" in amount of crystalline phase.

Young's modulus (room temperature) was measured by a pulse echo overlap method using a columnar sample of 10 mmφ × 20 mm (length). Thermal shock resistance ΔTc (°C.) was measured by an in-water quenching method wherein a test piece heated to a given temperature was placed into water to quench it and the reduction in room temperature strength of the test piece was examined.

Average pore diameter and pore group diameter were measured by subjecting a sintered material to polishing to allow the material to have a mirror surface and subjecting the mirror surface to image analysis using an optical microscope. Pore group density was determined by subjecting a sintered material to the same polishing, subjecting the resulting material to an oxidation treatment in air, and then measuring the number of pore groups per unit area. The oxidation treatment enables easy measurement of the number of pore groups. The size of each pore group looks larger than the actual diameter of each pore group.

Figure 2:
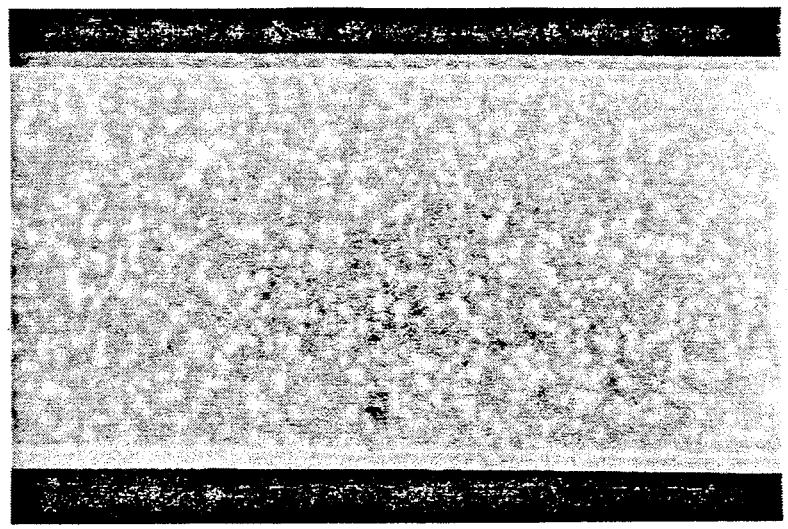
FIG. 2 is a micrograph of the silicon nitride sintered material of Example 1 according to the present invention after the polished surface has been oxidized.

FIG. 2 is photomicrograph of the silicon nitride sintered material of Example 1 of the present invention after the polished surface has been oxidized. In the photomicro-graph, white spots are groups of pores.

Figure 3:
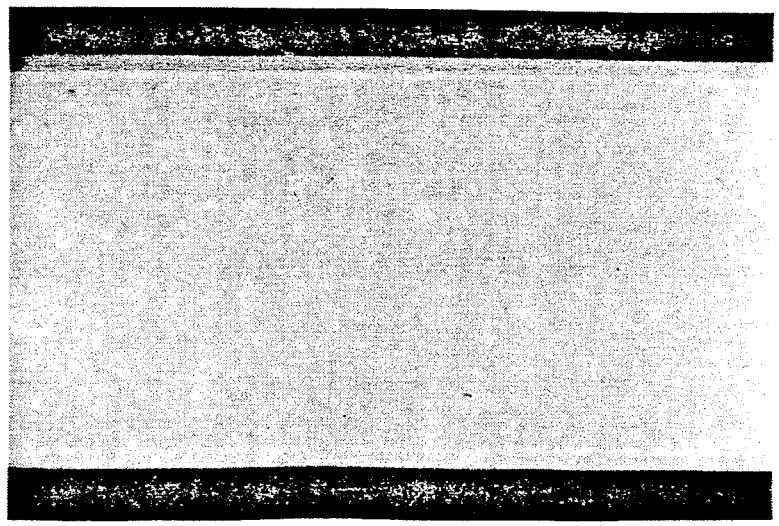
FIG. 3 is a micrograph of the silicon nitride sintered material of Comparative Example 1 after the polished surface has been oxidized.

Meanwhile, FIG. 3 is photomicrograph of the silicon nitride sintered material of Comparative Example 1 after the polished surface has been oxidized, wherein no white spots having a diameter of 30 μm or more are seen.

Figure 4:
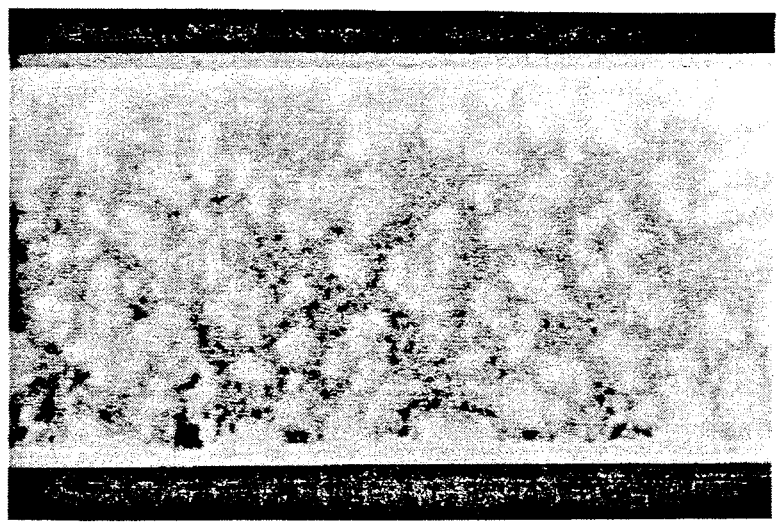
FIG. 4 is a micrograph of the silicon nitride sintered material of Comparative Example 3 after the polished surface has been oxidized.

FIG. 4 is photomicrograph of the silicon nitride sintered material of Comparative Example 3 after the polished surface has been oxidized, wherein pore groups of abnormally large size are seen.

TABLE 1

| | | | | | | | Example | | | | |
|---|---|---|---|---|---|---|---|---|---|---|---|
| | | | No. | 1 | 2 | 3 | 4 | 5 | 6 | 7 | 8 | 9 |
| Powders mixed | Proportions (wt %) | $Y_2O_3$ | | 3.4 | 3.2 | — | 2.0 | 2.0 | 2.0 | 9.9 | 4.2 | 3.4 |
| | | $Yb_2O_3$ | | 13.9 | 13.3 | 14.9 | 8.9 | 6.9 | 4.0 | 0 | 16.8 | 13.5 |
| | | Other(s) Carbide(s) | | SiC 1 | SiC 5 | SiC 0.5 | WC 1 | $Mo_2C$ 1 | SiC 0.5 $Mo_2C$ 0.5 | TiC 1 | NbC 1 | SiC 10 |
| | Chemical analysis | C content (wt %) | | 0.35 | 1.55 | 0.20 | 0.11 | 0.10 | 0.23 | 0.25 | 0.13 | 3.05 |
| | | O content (wt %) | | 4.53 | 4.35 | 4.55 | 3.76 | 3.41 | 3.02 | 4.19 | 4.93 | 4.28 |
| Sintered material | Chemical analysis | C content (wt %) | | 0.05 | 0.75 | 0.10 | 0.04 | 0.04 | 0.05 | 0.03 | 0.02 | 1.50 |
| | | O content (wt %) | | 3.98 | 3.24 | 3.43 | 3.26 | 2.95 | 2.52 | 3.39 | 4.43 | 2.98 |
| | Structure of sintered material | Average pore diameter (μm) | | 5 | 10 | 2 | 2 | 2 | 3 | 3 | 3 | 10 |
| | | Pore group diameter (μm) | | 70 | 100 | 30 | 20 | 20 | 30 | 35 | 30 | 100 |
| | | Pore group density (per mm$^2$) | | 30 | 50 | 15 | 10 | 11 | 16 | 20 | 15 | 100 |
| | | Surface layer thickness (μm) | | — | — | — | — | — | — | — | — | — |
| | | Crystalline phase of surface layer | | — | — | — | — | — | — | — | — | — |
| | Mechanical properties | Flexural strength | | | | | | | | | | |
| | | R.T. (MPa) | | 820 | 800 | 750 | 850 | 780 | 690 | 790 | 710 | 750 |
| | | 1000° C. (MPa) | | 820 | 800 | 750 | 850 | 780 | 690 | 790 | 710 | 750 |
| | | 1400° C. (MPa) | | 820 | 800 | 740 | 840 | 750 | 670 | 760 | 700 | 740 |
| | | Young's Modulus R.T. (GPa) | | 260 | 250 | 270 | 270 | 270 | 270 | 270 | 270 | 250 |
| | | Thermal shock resistance (°C.) | | 1300 | 1300 | 1100 | 1300 | 1150 | 1000 | 1200 | 1050 | 1200 |
| | | Relative density of sintered material (%) | | 99 | 99 | 97 | 97 | 99 | 99 | 99 | 99 | 95 |

TABLE 1-continued

|  |  |  |  |  |  |  |  |  |  |  |
|---|---|---|---|---|---|---|---|---|---|---|
|  | Crystalline phase of grain be undary | J | J | J | H | H > J | L > S | J | J | J |
| Firing conditions | Firing temperature (°C.) | 1900 | 1900 | 1700 | 2100 | 1900 | 1900 | 1950 | 1900 | 1900 |
|  | Firing time (hr) | 4 | 4 | 6 | 2 | 4 | 4 | 3 | 4 | 6 |
|  | Nitrogen pressure (atm) | 10 | 10 | 1 | 100 | 10 | 10 | 50 | 10 | 10 |
| Heat treatment conditions | Heat treatment temperature (°C.) | — | — | — | — | — | — | — | — | — |
|  | Heat treatment time (hr) | — | — | — | — | — | — | — | — | — |

|  |  |  | Example | | | | | |
|---|---|---|---|---|---|---|---|---|
|  |  | No. | 10 | 11 | 12 | 13 | 14 | 15 |
| Powders mixed | Proportions (wt %) | $Y_2O_3$ | 3.4 | 3.4 | 3.4 | 1.9 | — | 1.9 |
|  |  | $Yb_2O_3$ | 13.9 | 13.9 | 13.9 | — | 6.7 | — |
|  |  | Other(s) |  |  |  | $Tm_2O_3$ 8.6 | $Lu_2O_3$ 6.7 | $Er_2O_3$ 12.5 |
|  |  | Carbide(s) | SiC 1 | SiC 1 | SiC 1 | $Mo_2C$ 4 | TaC 4 | $Mo_2C$ 4 |
|  | Chemical analysis | C content (wt %) | 0.35 | 0.35 | 0.35 | 0.26 | 0.30 | 0.26 |
|  |  | O content (wt %) | 4.53 | 4.53 | 4.53 | 3.48 | 3.68 | 4.01 |
| Sintered material | Chemical analysis | C content (wt %) | 0.05 | 0.05 | 0.05 | 0.03 | 0.09 | 0.04 |
|  |  | O content (wt %) | 3.98 | 3.98 | 3.98 | 2.88 | 3.14 | 3.48 |
|  | Structure of sintered material | Average pore diameter (μm) | 5 | 5 | 5 | 8 | 5 | 4 |
|  |  | Pore group diameter (μm) | 70 | 70 | 70 | 80 | 70 | 50 |
|  |  | Pore group density (per mm²) | 30 | 30 | 30 | 50 | 40 | 50 |
|  |  | Surface layer thickness (μm) | 30 | 100 | 20 | — | — | — |
|  |  | Crystalline phase of surface layer | S > L,C | S > L,C | S > L,C | — | — | — |
|  | Mechanical properties | Flexural strength |  |  |  |  |  |  |
|  |  | R.T. (MPa) | 850 | 850 | 750 | 770 | 780 | 800 |
|  |  | 1000° C. (MPa) | 850 | 850 | 750 | 770 | 780 | 800 |
|  |  | 1400° C. (MPa) | 850 | 850 | 740 | 750 | 760 | 780 |
|  |  | Young's Modulus R.T. (GPa) | 260 | 260 | 270 | 250 | 250 | 250 |
|  |  | Thermal shock resistance (°C.) | 1350 | 1350 | 1100 | 1200 | 1200 | 1300 |
|  |  | Relative density of sintered material (%) | 99 | 99 | 97 | 98 | 98 | 98 |
|  |  | Crystalline phase of grain be undary | J,H | J,H | J,H | H > L | J | J |
| Firing conditions | Firing temperature (°C.) |  | 1900 | 1900 | 1900 | 2000 | 1900 | 1900 |
|  | Firing time (hr) |  | 4 | 4 | 4 | 3 | 4 | 4 |
|  | Nitrogen pressure (atm) |  | 10 | 10 | 10 | 100 | 10 | 10 |
| Heat treatment conditions | Heat treatment temperature (°C.) |  | 1300 | 1500 | 1000 | — | — | — |
|  | Heat treatment time (hr) |  | 1 | 1 | 5 | — | — | — |

TABLE 2

|  |  |  | Comparative Example | | | | | |
|---|---|---|---|---|---|---|---|---|
|  |  |  | 1 | 2 | 3 | 4 | 5 | 6 |
| Powders mixed | Proportions (wt %) | $Y_2O_3$ | 3.4 | 2.2 | 2.0 | 5 | 2.9 | 5.0 |
|  |  | $Yb_2O_3$ | 14.0 | 8.8 | 8.9 | — | 11.9 | 19.0 |
|  |  | Other(s) | — | — | — | MgO 3 ZrO₂ 0.3 | — | — |
|  |  | Carbide(s) | SiC 0.1 | — | SiC 1 | SiC 1 | SiC 15 | SiC 1 |
|  | Chemical analysis | C content (wt %) | 0.08 | 0.05 | 0.35 | 0.35 | 4.54 | 0.35 |
|  |  | O content (wt %) | — | 3.80 | 4.53 | 4.60 | 3.90 | 5.40 |
| Sintered material | Chemical analysis | C content (wt %) | 0.05 | 0.05 | 0.02 | 0.32 | 4.04 | 0.06 |
|  |  | O content (wt %) | — | 3.40 | 3.70 | 4.48 | 3.07 | 4.50 |
|  | Structure of sintered material | Average pore diameter (μm) | 2 | 2 | 10 | 2 | 15 | 10 |
|  |  | Pore group diameter (μm) | 20 | No pore group | 250 | No pore group | No pore group | No pore group |
|  |  | Pore group density (per mm²) | 5 |  | 10 |  |  |  |
|  |  | Surface layer thickness (μm) | — | — | — | — | — | — |
|  |  | Crystalline phase of surface layer | — | — | — | — | — | — |
|  | Mechanical properties | Flexural strength |  |  |  |  |  |  |
|  |  | R.T. (MPa) | 770 | 700 | 500 | 1000 | 500 | 600 |
|  |  | 1000° C. (MPa) | 770 | 650 | 500 | 1000 | 500 | — |

TABLE 2-continued

|  |  | Comparative Example | | | | | |
|---|---|---|---|---|---|---|---|
|  |  | 2 | 3 | 4 | 5 | 6 |
|  | 1400° C. (MPa) | 750 | 600 | 500 | 300 | — | — |
|  | Young's Modulus R.T. (GPa) | 300 | 300 | 250 | 270 | 250 | — |
|  | Thermal shock resistance (°C.) | 800 | 800 | 500 | 900 | 500 | — |
|  | Relative density of sintered material (%) | 97 | 96 | 99 | 98 | 80 | 85 |
|  | Crystalline phase of grain boundary | J > H | H > S | J | J | J > H |  |
| Firing conditions | Firing temperature (°C.) | 1900 | 1900 | 1900 | 1700 | 1850 | 1900 |
|  | Firing time (hr) | 2 | 2 | 10 | 1 | 5 | 2 |
|  | Nitrogen pressure (atm) | 10 | 10 | 10 | 1 | 5 | 10 |
| Heat treatment conditions | Heat treatment temperature (°C.) | — | — | — | — | — | — |
|  | Heat treatment time (hr) | — | — | — | — | — | — |

As is seen from Tables 1 and 2, the sintered materials of Examples 1-15 of the present invention using rare earth element oxides as a sintering aid and carbides, have a high relative density of 95% or more, a low Young's modulus of 270 GPa or less and a high thermal shock resistance $\Delta Tc$ (°C.) of 1,000° C. or more. Meanwhile, the sintered materials of Comparative Examples 1 and 2 using a carbide in an amount of less than 0.5% by weight, have pore groups of less than 30 $\mu$m in diameter and accordingly have a high Young's modulus of 300 GPa and a low thermal shock resistance $\Delta Tc$ (°C.) of less than 1,000° C. although they have about the same strength as the sintered materials of the present invention.

The sintered material of Comparative Example 5 having an average pore diameter of more than 10 $\mu$m and the sintered material of Comparative Example 3 having pore groups of more than 100 $\mu$m in diameter, have a low strength and accordingly a low thermal shock resistance $\Delta Tc$ (°C.) although they have a low Young's modulus.

Further, as appreciated from Examples 10-12, when the sintered material of the present invention is heat-treated at 1,000-1,500° C. in air, a surface layer consisting of silicates of rare earth elements and silicon oxide is formed on the surface of the sintered material, and such a sintered material has a higher strength and higher thermal shock resistance.

What is claimed is:

1. A process for producing a thermal shock-resistant silicon nitride sintered material containing at least 10 pore groups per mm$^2$, wherein each pore group has a diameter of 30 to 100 $\mu$m and consists of pores having diameters of 10 $\mu$m or less, said process comprising:
   mixing starting materials consisting of silicon nitride powders, rare earth oxide powders and 0.5-5 wt % carbide powders;
   shaping the mixed starting materials to obtain a shaped material; and
   firing said shaped material at a temperature of 1700°-2100° C. for 3-6 hours in a nitrogen atmosphere to decompose the carbide powders to form said pore groups in the resulting sintered material.

2. The process of claim 1, further comprising the step of subjecting the sintered material to a heat treatment at 1000°-1500° C. in an oxygen-containing atmosphere to obtain a thermal shock-resistant silicon nitride sintered material having a surface layer of 5-100 $\mu$m in thickness and consisting of silicates of rare earth elements and silicon oxide.

3. A process for producing a thermal shock-resistant silicon nitride sintered material containing at least 10 pore groups per mm$^2$, wherein each pore group has a diameter of 30 to 100 $\mu$m and consists of pores having diameters of 10 $\mu$m or less, said process comprising:
   mixing starting materials consisting of silicon nitride powders, rare earth oxide powders, and 0.5-5 wt % carbide powders having an average particle diameter of 0.4-3 $\mu$m;
   shaping the mixed starting materials to obtain a shaped material; and
   firing said shaped material in a nitrogen atmosphere to decompose the carbide powders to obtain said thermal shock-resistant silicon nitride sintered material;
   whereby the carbon content in said thermal shock-resistant silicon nitride sintered material is less than half the carbon content in said starting materials.

4. The process of claim 3, wherein said shaped material is fired at a temperature ranging from 1700° C.-2100° C. for 3-6 hours.

5. The process of claim 3, wherein an amount of said rare earth oxide powders in said starting materials is 6-21 wt. %.

* * * * *